United States Patent [19]
Nielson et al.

[11] Patent Number: 6,133,391
[45] Date of Patent: *Oct. 17, 2000

[54] ADHESIVE COMPOSITIONS AND ADHESIVE TAPES COMPRISING ZWITTERIONIC COPOLYMERS, AND NOVEL ZWITTERIONIC COPOLYMERS

[75] Inventors: Kent E. Nielson, Dorchester, Canada; Kai Li, Arcadia, Calif.; Terry J. Rayner, London, Canada

[73] Assignee: 3M Innovative Properties Company, St. Paul, Minn.

[ * ] Notice: This patent is subject to a terminal disclaimer.

[21] Appl. No.: 09/042,980

[22] Filed: Mar. 17, 1998

[51] Int. Cl.$^7$ .................................................. C08F 120/60
[52] U.S. Cl. .................. 526/307; 526/307.4; 526/328.5; 428/355
[58] Field of Search ..................... 526/307, 320, 526/328.5, 277, 312, 307.4; 428/355; 424/70.16, 70.17; 510/476

[56] References Cited

U.S. PATENT DOCUMENTS

| | | |
|---|---|---|
| 2,838,421 | 6/1958 | Sohl et al. ............................... 117/122 |
| 3,096,202 | 7/1963 | De Groot Von Arx ................ 117/68.5 |
| 3,411,912 | 11/1968 | Dykstra et al. ............................. 96/87 |
| 3,441,430 | 4/1969 | Peterson ................................. 117/68.5 |
| 3,549,605 | 12/1970 | Dykstra et al. ......................... 260/79.3 |
| 3,671,502 | 6/1972 | Samour et al. ......................... 260/79.3 |
| 3,673,158 | 6/1972 | Reader et al. .......................... 260/75 N |
| 3,723,260 | 3/1973 | Rushmere ................................. 204/49 |
| 3,723,262 | 3/1973 | Rushmere ............................... 204/55 R |
| 3,763,117 | 10/1973 | McKenna et al. ................. 260/78.5 E |
| 3,770,708 | 11/1973 | Knoepfel et al. ..................... 260/80.73 |
| 3,861,948 | 1/1975 | Samour et al. ................... 117/122 PF |
| 3,865,770 | 2/1975 | Blake ..................................... 260/27 R |
| 3,890,292 | 6/1975 | Bohme et al. ........................ 260/80.76 |
| 3,922,464 | 11/1975 | Silver et al. ............................. 428/355 |
| 4,138,345 | 2/1979 | Williams ............................. 252/8.55 D |
| 4,210,489 | 7/1980 | Markofsky ........................... 162/164 R |
| 4,341,680 | 7/1982 | Hauber et al. ........................... 525/329 |
| 4,413,080 | 11/1983 | Blake ...................................... 524/187 |
| 4,413,082 | 11/1983 | Gleichenhagen et al. .............. 524/243 |
| 4,442,258 | 4/1984 | Sunakawa et al. ...................... 524/767 |
| 4,569,960 | 2/1986 | Blake ...................................... 524/145 |
| 4,985,487 | 1/1991 | Shih et al. ............................... 524/548 |
| 5,106,416 | 4/1992 | Moffatt et al. ............................ 106/20 |
| 5,144,060 | 9/1992 | Morita et al. ............................ 560/170 |
| 5,208,295 | 5/1993 | Chaudhuri et al. ................... 525/327.6 |
| 5,216,048 | 6/1993 | Agarwal et al. ........................... 524/60 |
| 5,256,751 | 10/1993 | Vanderlaan .............................. 526/304 |
| 5,489,642 | 2/1996 | Gleichenhagen et al. .............. 524/504 |
| 5,652,296 | 7/1997 | Randen ................................... 524/547 |
| 5,846,558 | 12/1998 | Neilsen ................................... 424/448 |

FOREIGN PATENT DOCUMENTS

| | | | |
|---|---|---|---|
| 1053581 | 5/1979 | Canada ................................... 167/166 |
| 1109888 | 9/1981 | Canada ............................... 260/386.5 |
| 2040337 | 12/1991 | Canada .......................... D21H 17/45 |
| 0 494 686 A1 | 7/1992 | European Pat. Off. ......... B01D 57/02 |
| 0 576 128 A1 | 12/1993 | European Pat. Off. ......... C08L 33/02 |
| 1077772 | 8/1967 | United Kingdom .......... C07C 141/10 |
| WO 93/06184 | 12/1992 | WIPO ............................ C09J 133/06 |

OTHER PUBLICATIONS

Galin et al, Statistical n–butyl acrylate sulfopropylammonium betaine coppolymers (Plasticizer studies), Macromolecule, 1993, 26, 4919–4927.

*Primary Examiner*—Yogendra Gupta
*Assistant Examiner*—Gregory E. Webb

[57] ABSTRACT

The invention relates to adhesive compositions comprising zwitterionic copolymers, including repulpable adhesive compositions, and adhesive tapes made with such compositions. The adhesive compositions comprise a zwitterionic copolymer and a zwitterionic plasticizer or tackifier which can be coated on a backing to form an adhesive tape. The repulpable tapes are formed from a repulpable adhesive composition comprising a zwitterionic copolymer coated on a repulpable backing. Examples of zwitterionic copolymers are those derived from the monomers N-(3-sulphopropyl)-N-methacryloxy-ethyl-N,N-dimethyl ammonium betaine or N-(3-sulphopropyl)-N-acryloxy-ethyl-N, N-dimethyl ammonium betaine. Some of the zwitterionic copolymers are novel.

17 Claims, No Drawings

ADHESIVE COMPOSITIONS AND ADHESIVE TAPES COMPRISING ZWITTERIONIC COPOLYMERS, AND NOVEL ZWITTERIONIC COPOLYMERS

FIELD OF THE INVENTION

The invention relates to adhesive compositions comprising zwitterionic copolymers, including repulpable adhesive compositions, and adhesive tapes made with such compositions. Some of the zwitterionic copolymers are novel.

BACKGROUND OF THE INVENTION

Adhesive compositions, such as pressure-sensitive adhesive (PSA) compositions, commonly contain an adhesive polymer together with a tackifier or plasticizer. The adhesive polymer provides cohesion and the tackifier or plasticizer increases tack.

Adhesives are useful in a wide range of applications and include PSAs which are used in labels, masking tapes and protective coverings. Further, pressure sensitive adhesive compositions which are water-dispersible are used for fastening cloth on mammalian body coverings and in papermaking and printing operations. In papermaking they may be used, for example, to splice the end of one roll of paper to the beginning of another roll.

In papermaking, in particular, it is desirable that the adhesives used are repulpable. That is, they can be left with the paper to be repulped without interfering with subsequent papermaking processes and are free of components which would blemish the final paper product. To be repulpable, such adhesives should be water soluble or water dispersible.

The current trend in papermaking is away from acid processing conditions toward alkaline processing conditions and toward an increased use of calcium carbonate filler. Conventional repulpable adhesives are usually unsuitable for such alkaline conditions. Further, those adhesives which might be suitable, tend to react with the calcium ions of a calcium carbonate filler to form agglomerates which decrease the solubility of the adhesive copolymers.

Adhesives used for splicing in the paper industry may be subjected to elevated temperatures under high shear forces, for example in supercalender applications. Any slippage, even fractions of a millimeter, may lead to blocking and subsequent web breakage. A high cohesive strength is desirable to withstand high pressure and heat, to resist lateral adhesive flow or "oozing" (which would result in slippage) and to resist adhesive loss by penetration into the paper or "bleeding". Further, an adhesive for use in papermaking is preferably repulpable under a variety of pH conditions (both alkaline and acidic).

SUMMARY OF THE INVENTION

According to one aspect of the present invention there is provided an adhesive composition comprising a zwitterionic copolymer and a zwitterionic plasticizer or tackifier.

According to a further aspect of the present invention there is provided a repulpable adhesive tape comprising a repulpable backing having coated thereon an adhesive composition comprising a repulpable zwitterionic copolymer.

DETAILED DESCRIPTION OF THE PREFERRED EMBODIMENTS

The zwitterionic copolymer comprises a component derived from a zwitterionic monomer together with a component or components derived from a hydrophobic or hydrophilic monomer or a mixture of components derived from hydrophobic and hydrophilic monomers.

The zwitterionic monomer must be one which is copolymerizable with any other monomer used. The zwitterionic monomers of the present invention include betaines. Mixtures of zwitterionic monomers may be used.

Suitable betaines include ammonium carboxylates, ammonium phosphates and ammonium sulphonates, preferably ammonium sulphonates. Preferred betaines are those of formulae

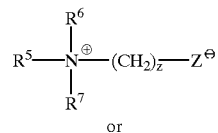

(II)

or

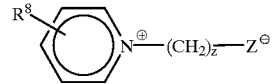

(III)

in which $R^5$ is a group containing a carbon-carbon unsaturated bond such as (meth)acryloxy-$(C_{2-4})$alkyl, (meth)acrylamido-$(C_{2-4})$alkyl or $(C_2–C_6)$alkenyl, $R^6$ is $C_{1-4}$ alkyl, $R^7$ is $C_{1-4}$ alkyl or $(C_2–C_6)$alkenyl, $R^8$ is $(C_2–C_6)$alkenyl, z is an integer of 2–4 and $Z^\ominus$ is $SO_3^\ominus$ or $CO_2^\ominus$. Particular zwitterionic monomers which may be mentioned are N-(3-sulphopropyl)-N-methacryloxyethyl-N,N-dimethyl ammonium betaine; N-(3-sulphopropyl)-N-acryloxyethyl-N,N-dimethyl ammonium betaine; N-(3-sulphopropyl)-N-methacrylamido-propyl-N,N-dimethyl ammonium betaine; 1-(3-sulfopropyl)-2-vinyl-pyridinium betaine; N-(3-sulphopropyl)-N,N-diallyl-N-methyl ammonium betaine; and N-(3-sulphopropyl)-N-allyl-N,N-dimethyl ammonium betaine.

Particularly preferred zwitterionic monomers are N-(3-sulphopropyl)-N-methacryloxy-ethyl-N,N-dimethyl ammonium betaine and N-(3-sulphopropyl)-N-acryloxy-ethyl-N,N-dimethyl ammonium betaine. N-(3-sulphopropyl)-N-methacryloxy-ethyl-N,N-dimethyl ammonium betaine is commercially available from Rashig AG, Germany. N-(3-sulphopropyl)-N-acryloxyethyl-N,N-dimethyl ammonium betaine may be prepared by condensation of N,N-dimethyl aminoethyl acrylate with 1,3-propanesultone. This latter betaine monomer may also be prepared by the addition of N,N-dimethyl aminoethyl acrylate to the condensation product of epichlorohydrin and sodium bisulphite.

Generally the zwitterionic monomer will comprise from about 10 to about 50 mole % of the monomer mixture used to prepare the copolymer, preferably about 10 to about 20 mole %. The balance of the monomer mixture will be a hydrophobic monomer, a hydrophilic monomer or a mixture of such monomers.

The hydrophobic monomer must be one which is copolymerizable with the other monomers of the copolymer. A combination of different hydrophobic monomers can be used. The hydrophobic monomer may be an acrylic or methacrylic ester of a non-tertiary alcohol, which alcohol has from 1 to 14 carbon atoms, preferably from 2 to 12 carbon atoms. It is preferred that the non-tertiary alcohol is an alkanol. Suitable alkanols to form the ester are alkanols such as ethanol, 1-propanol, 2-propanol, 1-butanol, 2-butanol, 1-pentanol, 2-pentanol, 3-pentanol, 2-methyl-1- butanol, 1-hexanol, 2-hexanol, 2-methyl-1-pentanol, 3-methyl-1-pentanol, 2-ethyl-1-butanol, 3-methyl-1-pentanol, 2-ethyl-1-butanol, 3,5,5-trimethyl-1-hexanol, 3-heptanol, 1-octanol, 2-octanol, iso-octanol, 2-ethyl-1-hexanol, 1-decanol, 1-dodecanol, 1-tridecanol and 1-tetradecanol.

Preferred hydrophobic monomers are the esters of (meth) acrylic acid with butyl alcohol, iso-octyl alcohol or 2-ethyl-1-hexanol or a combination thereof.

The hydrophobic monomer can range generally from 0 to about 85 mole % of the monomer mixture used to prepare the copolymer, more preferably from about 50 to about 75 mole %. Generally a higher content of hydrophobic monomer will reduce water-dispersibility of the final copolymer.

The hydrophilic monomer must be one which is copolymerizable with the other monomers of the copolymer. The hydrophilic monomer may have hydroxy, alkoxy, or amide functional groups. Examples of suitable hydrophilic monomers are hydroxyethyl acrylate, hydroxypropyl acrylate, hydroxybutyl acrylate, methoxyethyl acrylate, ethoxyethyl acrylate, ethoxyethoxyethyl acrylate, propoxyethyl acrylate, propoxypropyl acrylate, butoxyethyl acrylate, butoxypropyl acrylate, carbowax 750, carbowax 550 and acrylamide. A mixture of different hydrophilic monomers may be used.

The hydrophilic monomer can range generally from 0 to about 50, preferably up to about 20 mole % of the monomer mixture used to prepare the copolymer. Generally a higher hydrophilic monomer content will increase the water-dispersibility of the copolymer.

Some of the zwitterionic copolymers are novel.

Thus according to another aspect of the present invention there is provided a zwitterionic copolymer comprising:

(1) a unit derived from (a) N-(3-sulphopropyl)-N-methacryl-oxyethyl-N,N-dimethyl ammonium betaine, (b) N-(3-sulphopropyl)-N-acryloxyethyl-N-acryloxyethyl-N,N-dimethyl ammonium betaine or (c) a combination thereof, and (2) a unit derived from a comonomer copolymerizable with component (1), with the proviso that when component (1) is other than the combination of (a) and (b), then the comonomer (2) is at least one member selected from the group consisting of 2-(2-ethoxy)ethoxyethyl acrylate and 2-butoxyethyl acrylate.

In some particular embodiments, the copolymer comprises:

(1) N-(3-sulphopropyl)-N-methacryloxy-ethyl-N,N-dimethyl 20 ammonium betaine or N-(3-sulphopropyl)-N-acryloxy-ethyl-N,N-dimethyl ammonium betaine and (2) 2-(2-ethoxy)ethoxy ethyl acrylate or 2-butoxyethyl acrylate; a combination of (1) units derived from (1)(a) N-(3-sulphopropyl)-N-methacryloxy-ethyl-N,N-dimethyl ammonium betaine, (1)(b) N-(3-sulphopropyl)-N-acryloxy-ethyl-N,N-dimethyl ammonium betaine and (2) a further comonomer copolymerizable with (1)(a) and (1)(b); N-(3-sulphopropyl)-N-methacryloxy-ethyl-N,N-dimethyl ammonium betaine and 2-(2-ethoxy)ethoxy ethyl acrylate or 2-buthoxyethyl acrylate; a combination of units derived from (1)(a) N-(3-sulphopropyl)-N-methacryloxy-ethyl-N,N-dimethyl ammonium betaine, (1)(b) N-(3-sulphopropyl)-N-acryloxy-ethyl-N,N-dimethyl ammonium betaine and (2) a comonomer selected from the group consisting of 2-(2-ethoxy) ethoxy ethyl acrylate, 2-butoxyethyl acrylate, 2-hydroxyethyl acrylate, 2-ethylhexyl acrylate and mixtures thereof.

In formulation of the adhesive copolymers, several different monomers can be combined, each selected to contribute some desired property (such as polarity or water solubility). Further, the polymerisation process may be varied to modify properties of the copolymer product. Such process variations, as known in the art, can determine whether the copolymer formed is linear, branched or core-shell. Suitable processes include batch, semi-batch, and pre-emulsification processes. Preferred processes are semi-batch or pre-emulsification processes with starve feed of the monomers.

An example of a suitable reaction mixture to prepare the copolymers is from about 30% to about 40%, of the total weight of the reaction mixture, of monomers, up to about 2.0% of a chain transfer agent, an initiator and from about 1% to about 2% of a surfactant, preferably about 2%. It is particularly preferred to use a combination of nonionic surfactant (1.5%) and ionic surfactant (0.5%). The chain transfer agent may be used to modify properties such as shear strength, heat resistance and water solubility or dispersibility of the product. For example, a copolymer having satisfactory adhesive properties but lacking satisfactory water solubility or water dispersibility, may be rendered more water soluble or dispersible by increasing the quantity of chain transfer agent in the reaction mixture during polymerization and formation of the copolymer.

Polymerization may be effected by dissolving or dispersing the monomers in water at a concentration of about 30% to about 40% by weight to pre-emulsify them. 0.3% of the surfactant is added to the reaction vessel with the remainder added to the monomer mixture. The initiator is dissolved in about 30 ml of water and 5 ml of this initiator solution is added to the reaction vessel. When a chain transfer agent is used, it is also added to the reaction vessel. The contents of the reaction vessel are heated to about 60 to 80° C. to form free radicals. A portion of the pre-emulsified monomers (about 20 to about 30 mL) is fed into the reaction vessel. After about 5 minutes, polymerization is initiated. The monomers and the initiator are fed simultaneously and continuously into the reaction mixture dropwise until all the monomer and initiator have been added to the reaction vessel. The reaction is allowed to proceed for about 4 hours.

When the reaction is complete, the resulting copolymer solution is cooled to room temperature and filtered to remove any coagulum. If other compounds are to form part of the adhesive composition, such as plasticizers or tackifiers, they may be added either before, during or after the polymerization process. The resulting aqueous pressure sensitive adhesive composition typically comprises from about 20% to 50% by weight solids.

When an initiator is used which generates acid during the polymerization, such as persulfate initiators, it is customary to neutralize the final copolymer emulsion. Neutralization can be accomplished with, for example, butyldiethanol amine. Such neutralization reduces corrosiveness of adhesive formulations prepared with the copolymers.

The chain transfer agents may be water or oil soluble. Up to 5%, preferably from 0.5% to 1%, based on the total weight of the monomers, of the chain transfer agent may be used. Typical chain transfer agents include mercaptoacetic acid, mercaptoethanol, 3-mercapto-1,2-propanediol, A-189 (available from Union Carbide) and 1-dodecanethiol.

The initiator is typically used at a level of 2%, preferably 0.5 to 1% by weight based on the total weight of the monomers. The initiators may be oil or water soluble. Thermal, redox, or UV initiator systems may be used. Suitable initiators include potassium persulfate and 4,4'-azobis(4-cyanovaleric acid).

The surfactant is used in an amount of up to 5%, preferably from 1 to 2% by weight, based on the total weight of the monomers. The surfactant may be anionic, nonionic or a combination thereof. Many surfactants are commercially available. For example, alkylphenol ethoxylates are available under the Tradename Igepal CA or Igepal CO 9. Rhone-Poulenc offers the following surfactants: phosphate esters under the Tradename Rhodafac; sulphonates under the Tradename Rhodacal; alkyl sulphates under the Tradename Rhodapon; amphoteric surfactants under the Tradename Abex; and ethoxylated polyoxypropylene block copolymers under the Tradename Antarox. Henkel offers a surfactant under the Tradename Disponil AES-21 which is an alkylphenol ether sulphate sodium salt.

The presence of the zwitterionic component in the copolymers means that cross-linking agents (which are often added to pressure-sensitive adhesive copolymers to improve cohesive strength and heat resistance) are not always required since the zwitterionic function provides some ionic cross-linking.

The use of a cross-linking agent may be advantageous to improve heat resistance or cohesive strength. However, if a water soluble or water dispersible copolymer is required, such as a repulpable copolymer for papermaking, it should be noted that increasing cross-linking reduces repulpability and that if there is too much cross-linking the copolymer will not readily disperse under the conditions needed for repulping in a papermaking process. Up to 2% by weight, based on the total weight of the monomers, of a cross-linking agent may be used. If a cross-linking agent is used, a preferred range is from 0.5 to 1% based on the total weight of the monomers. Suitable cross-linking agents include metal chelates, epoxides, aziridines, melamine formaldehyde resins and polyamide epichlorohydrins.

Generally the zwitterionic copolymers are water-dispersible or water soluble and can be used as an adhesive component, with an appropriate tackifier or plasticizer, of repulpable PSA compositions. Some of the zwitterionic copolymers may need some additional modification to be suitable for repulpable adhesive compositions. For example, as mentioned above, chain transfer agents may be added during polymerization to reduce the molecular weight of the final copolymer and thus increase the water solubility or dispersibility.

Plasticizers and tackifiers are generally added to the adhesive copolymers to form adhesive compositions. Conventional tackifiers include polysaccharide gums, rosins, rosin derivatives (such as Tacolyn 98 available from Hercules), alkyl/aryl hydrocarbon resins and derivatives, and petroleum-aliphatic resins. Conventional plasticizers include polyoxyethylene alkylphenyl ether phosphates, polyoxyethylenealkyl ether phosphates, polyethyleneglycol-monophenyl ethers, octylphenoxypoly(ethyleneoxy) ethanols and nonylphenoxypoly(ethyleneoxy) ethanols.

In view of the zwitterionic nature of the adhesive copolymers, zwitterionic tackifiers and plasticizers, such as those disclosed in applicant's copending application U.S. Ser. No. 09/040,024, filed on the same data herewith hereby incorporated by reference), have been found to be most suitable.

Such zwitterionic tackifiers and plasticizers include the following compounds of formula I

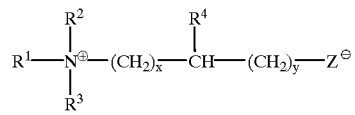

wherein
 $R^1$, $R^2$ and $R^3$ are each alkyl, hydroxyalkyl, aminoalkyl or aryl which may be interrupted in the alkyl chain by one or more oxygen atoms,
 $R^4$ is H or OH,
 $Z^\ominus$ is $CO_2^\ominus$ or $SO_3^\ominus$,
 x and y are each 0, 1 or 2 provided that the sum of x and y is less than or equal to 4 preferably the sum of x and y is less than or equal to 3.

Preferably the alkyl groups in the above moieties of $R^1$, $R^2$ and $R^3$ have from 1 to 12 carbon atoms, more preferably from 1 to 8 and in particular from 1 to 2 carbon atoms.

It is also preferred that $R^2$ and $R^3$ are the same and $R^1$ is different.

Particular examples of such tackifiers and plasticizers are:

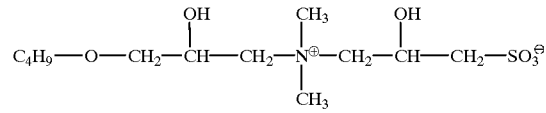

N-(2-hydroxy-3-sulphopropyl)-N,N-dimethyl-N-(3-butyloxy-2-hydroxypropyl)-ammonium betaine

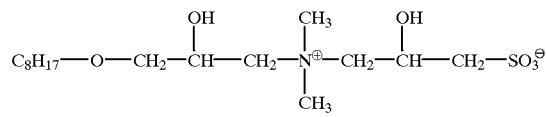

N-(2-hydroxy-3-sulphopropyl)-N,N-dimethyl-N-(3-octyloxy-2-hydroxypropyl)-ammonium betaine

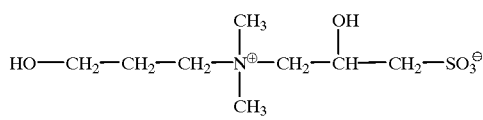

N-(2-hydroxy-3-sulphopropyl)-N,N-dimethyl-N-(3-hydroxypropyl)-ammonium betaine

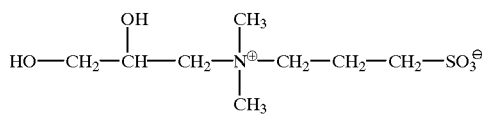

N-(3-sulphopropyl)-N,N-dimethyl-N-(2,3-dihydroxypropyl)-ammonium betaine

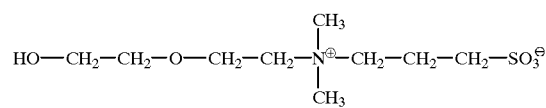

N-(3-sulphopropyl)-N-N-dimethyl-N-2-(2-hydroxyethyloxy)ethyl-ammonium betaine

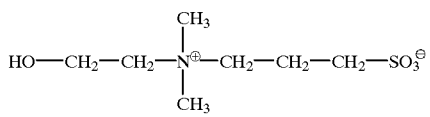

N-(3-sulphopropyl)-N,N-dimethyl-N-(2-hydroxyethyl)-ammonium betaine

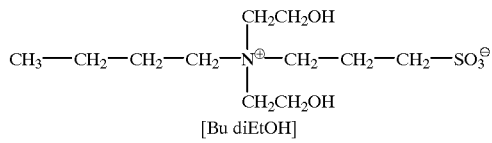
[Bu diEtOH]

N-(3-sulphopropyl)-N,N-di(2-hydroxyethyl)-N-butyl-ammonium betaine

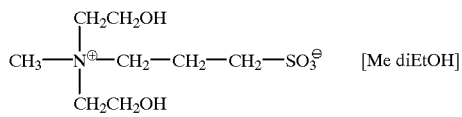
[Me diEtOH]

N-(3-sulphopropyl)-N,N-di(2-hydroxyethyl)-N-methyl-ammonium betaine

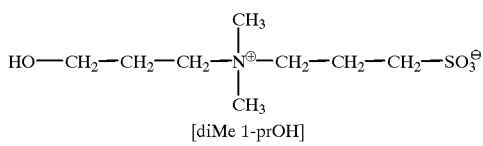
[diMe 1-prOH]

N-(3-sulphopropyl)-N,N-dimethyl-N-(3-hydroxypropyl)-ammonium betaine

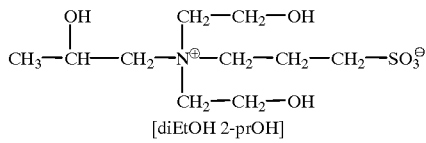
[diEtOH 2-prOH]

N-(3-sulphopropyl)-N,N-di(2-hydroxyethyl)-N-(2-hydroxypropyl)-ammonium betaine

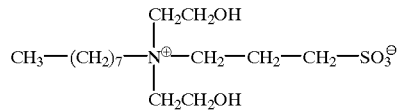

N-(3-sulphopropyl)-N,N-di(2-hydroxyethyl)-N-octyl-ammonium betaine

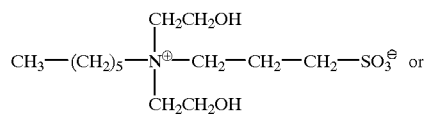 or

N-(3-sulphopropyl)-N,N-di(2-hydroxyethyl)-N-hexyl-ammonium betaine

Of the above, N-(2-hydroxy-3-sulphopropyl)-N,N-dimethyl-N-(3-hydroxypropyl)-ammonium betaine, Bu diEtOH, Me diEtOH, diME 1-prOH and diEtOH 2pr-OH are preferred.

As is known, various other compounds can be added to improve the characteristics of the final adhesive formulation. Compounds such as PVP K-30 and PVP K-90 (commercially available polyvinlypyrrolidones of molecular weight 57,500 and 1,270,000 respectively) can be added to improve the strength and toughness of the base adhesive copolymer. FC-171 (a fluorochemical) can be added, for example as a 10% aqueous solution, to improve wetting characteristics of the final adhesive formulation.

The tackifiers and plasticizers are added to an adhesive polymer, together with any other additives, to form an adhesive composition. Whilst the amounts used may vary depending on the nature of the components of the adhesive composition, generally they are effective when added at a rate of 30 to 100 parts by weight based on 100 parts by weight of the adhesive polymer. Such adhesive compositions may be prepared in the usual way by blending or mixing. The tackifiers and plasticizers may be added, for example, to an aqueous emulsion of the formed adhesive polymer, or may be added to a monomer feed stream before formation of the adhesive polymer.

A pressure sensitive adhesive tape may be made by applying the pressure sensitive adhesive composition to one or more surfaces of a substrate backing to form a one-sided or double-sided tape. If the tape is to be repulpable, the substrate backing should also be repulpable. An example of such a repulpable backing is a tissue paper.

A release liner may be used to cover and protect the exposed surfaces of the pressure sensitive adhesive tape between manufacture and use. Commercially available release liners include siliconized paper release liners.

Repulpable adhesives may be applied directly to a substrate, that is, without any backing, in the form of a spray or a bead. For example, in papermaking, the PSA may be applied to a paper surface adjacent the trailing edge of one roll and then the leading edge of the next roll may be pressed directly onto the adhesive thus joining the edges of the two rolls. When used without a backing, the adhesive can be fortified with fibres for easy handling. For a repulpable tape, suitable fibres include cellulosic fibres or polyvinyl alcohol fibres.

Repulpable PSA formulations should adhere to at least common types of paper such as AKD sized; paper for offset printing ("offset"); European bond paper; Canadian bond paper; and paper for rotogravure printing ("rotogravure").

It has been found that the use of zwitterionic polymers in formulating adhesive compositions may also provide the following advantages: both high tack and low tack formulations may be prepared from a common base polymer; neutralization of the polymers may not be required to provide water dispersibility; curing agents may not be needed to give the polymers heat resistance and cohesive strength; and the polymers may be formulated into adhesive compositions which have well-balanced properties.

Besides repulpable adhesives for papermaking the adhesives and adhesive formulations of the invention are also useful for a variety of other applications such as for labels, masking tapes and stamps as well as for vapour strippable products such as wall paper or other decorative wall coverings.

TEST PROCEDURES

It is believed that a brief explanation of certain test procedures will be helpful in understanding the invention.

Delrin wheel Tack Test

In this test, a standard Delrin wheel weighing 28.8 g with diameter of 8.13 cm (3.2 inches), a rim width of 1.9 cm (0.75 inches), a thickness of 0.16 cm (1/16 inches), a hollow axle with a diameter of 1.27 cm (0.5 inches) and a length of 3.175 cm (1.25 inches) is rolled down a plane having a length of 26.7 cm (10.51 inches) and incline of 24 to a horizontal surface on which the tape to be evaluated is positioned, adhesive side up. The distance the wheel rolls along the horizontal adhesive surface is measured in mm, the tack being inversely proportional to the distance. For an adhesive formulation for a permanent tape, the distance the Delrin wheel rolls may be around 300 mm or more. The shorter the distance the wheel rolls, the greater the tack. For example, for the greater tack required by an adhesive formulation for a temporary tape, a lower value, such as 30 mm, might be expected.

Repulpability

Dispersibility is measured by evaluating repulpability according to TAPPI test UM-213. Samples are prepared by coating 2 gm of the adhesive or adhesive formulation to be tested onto one side of a backing strip 20 cm by 2.54 cm (2 gm on each side to test double faced tape). For double faced tape, one sample is sandwiched between two 20 cm×2.54 cm strips of blotter paper; and for single faced tape, two samples are adhered to blotter paper. The samples are cut into approximately 1.5 cm squares. To these squares are added a sufficient number of 1.5 cm squares of uncoated blotter paper to make a total of samples and uncoated blotter paper of 15 g, and all the squares are placed in a Waring blender with 500 mL of water. After the blender has run for 20 seconds, it is stopped for 1 minute while the stock which has splashed up the sides and onto the cover is washed back into the bottom with a water bottle. The blender is again run for 20 seconds, washed down as before, and run for a final 20 second cycle. The stock is then removed from the blender and made into a handsheet on a sheet mold. The sheet is removed from the mold, pressed between sheets of blotter stock for 1.5 minutes in a hydraulic press, dried, and examined for any particles of unrepulped tape. If no particles are present, the tape is considered to have passed the test.

Another method for determining the repulpability of these products is the PTS Method. For this method, copy/bond paper is cut into strips of 48 g each. To each strip is applied 2 g of the adhesive formulation. Each of these strips is then a sample to be tested. The test is normally conducted at pH 7, but pH 4 and pH 10 may be used for a full test to determine repulpability under acidic and alkaline conditions. The samples are transferred into a standard disintegrator and diluted with water to obtain a total volume of 2,000 mL. The sample is disintegrated for 10 minutes (±30 seconds) with a rotor speed of about 3000 rpm. The pulp suspension is put in a vessel, diluted to a total volume of L and homogenized for approximately 2 minutes. 400 ml samples of the resulting homogenized liquid are removed to make handsheets. The test handsheets, so prepared, are viewed against a light source. Any defects or transparent spots, caused by non-dispersible constituents in the homogenized liquid used to prepare the handsheets, are counted and characterized by size and colour.

If no defects or transparent specs are observed, the formulation used in the sample will be considered repulpable. If a few transparent specs are observed, the formulation will be considered "marginally" repulpable. That is, the substance will be considered water dispersible but not repulpable according to the PTS test used.

These tests do not apply to tape products where the backing is a polyester film, which does not lend itself to repulping. Such backings are strong, however, and may be used in tape constructions, provided the loosed backing is mechanically removed.

Unless otherwise stated, the PTS test method at pH 7 was used for repulpability tests in the following examples.

T-Peel Adhesion Test

This test is for 180° peel adhesion to paper. A 3.175 cm strip of bond paper is laminated to a 5 cm×12.5 cm stainless test panel using a double-faced pressure sensitive tape. One end of a 2.54 cm×25 cm strip of sample tape is then applied to laminated bond paper (if the sample is a double-faced tape, then 68 g/m$^2$ Kraft paper backing is placed on one adhesive side of the sample). To ensure uniform adhesive contact, a 2 kg roller is passed over the 12.5 cm sample length at a rate of 50 mm/minute. The tape is then doubled back on itself and peeled from the bond paper surface at a rate of 50 mm/minute. The force required to remove the tape is recorded. The values obtained from the test are expressed in the units of Newtons per cm.

Static Shear

A static shear test provides information on the ability of the splice to withstand shear forces in a paper processing operation. An overlap splice (2.54 cm 2.54 cm) is prepared and pressed with a 2 kg roller (2 passes). The splices are conditioned for 20 minutes to acclimatize them to the temperature and humidity of the test conditions, and then a 1 kg weight is suspended from the splice in a vertical manner. The time in minutes for the splice to fail is recorded.

Heat Resistance

This test simulates the shear forces encountered by a paper splice at elevated temperature.

An overlap splice (2.54 cm×2.54 cm) is prepared and rolled twice with a 5 kg roller. The splice is allowed to dwell or condition for 1 minute prior to being contacted with a curved heated surface, which is maintained at 150° C. One end of the splice is held with a clamp to prevent it from moving during the test. The other end of the splice is threaded over the curved surface. A 2 kg weight is attached to this end which is allowed to hang, supporting the weight. The time required for the splice to separate (adhesive shear failure) is then measured in seconds. The time is measured from the moment of first contact with the heated surface. If the splice does not separate in 2 minutes, the amount of slippage in mm is recorded.

ABBREVIATIONS

In the following examples and tables, abbreviations used are as follows:

AA stands for acrylic acid;

BA stands for butyl acrylate;

EOA stands for 2-ethoxyethyl acrylate;

EOEOA stands for 2-(2-ethoxy)ethoxyethyl acrylate;

IOA stands for iso-octyl acrylate;

MEA stands for 2-methoxyethyl acrylate;

BuOEtA stands for 2-butoxyethyl acrylate;

CTA stands for chain transfer agent;

AES-21 stands for Disponil AES-21 which is a surfactant;

SPE stands for N-(3-sulphopropyl)-N-methacryloxyethyl-N,N-dimethyl ammonium betaine;

SP-A stands for N-(3-sulphopropyl)-N-acryloxyethyl-N,
N-dimethyl ammonium betaine;

HEA stands for 2-hydroxyethyl acrylate;

EHA stands for 2-ethylhexyl acrylate;

Bu diEtOH, Me diEtOH, diMe 1-prOH and diEtOH 2-prOH refer to the zwitterionic compounds obtained by reaction of 1,3-propane sultone with butyldiethanol amine, methyldiethanol amine, N,N-dimethyl-1-propanol amine and N,N-diethanol-2-propanol amine respectively. The full structures of these four zwitterionic compounds are given above.

PREPARATION OF COPOLYMERS BA/SPE

A 1-liter resin flask was charged with butyl acrylate (24 g, 0.188 mol), SPE (16.8 g, 0.060 mol), Triton X-200 (2.9 g 2% by weight based on monomers, 28% active) and deionized water (122 mls). The flask was fitted with a mechanical stirrer and an argon purge. The contents were stirred, heated at 60° C. and purged for one hour. Potassium persulfate (0.397 g, 0.0015 mol) was added and the reaction was continued for five hours. The emulsion was filtered through cheesecloth and cooled to ambient temperature. The product was characterized by DMA and elemental analysis.

The above method was repeated varying the mole % of the two monomers to obtain a series of copolymers of graded zwitterionic content. The mole % of the monomer mixtures used to obtain each copolymer is shown below in Table A as Examples A through I.

TABLE A

| Preparation Example | BA | SPE |
| --- | --- | --- |
| A | 95 | 5 |
| B | 92 | 8 |
| C | 89 | 11 |
| D | 86 | 14 |
| E | 83 | 17 |
| F | 79 | 21 |
| G | 76 | 24 |
| H | 72 | 28 |
| I | 67 | 33 |

The copolymers obtained, without formulation with other additives, were then tested for repulpability using the PTS method as described above. The copolymers of examples F, G, H and I were found to be repulpable without further modification of the copolymer. The copolymers of examples D and E showed some small specs and were considered marginally repulpable.

The other copolymers used in the examples were prepared similarly to the preparation of BA/SPE given above by varying the nature and quantity of the monomers.

EXAMPLES 1-1 to 1-8

Copolymers were prepared using various monomers in combination with the zwitterionic monomer SPE. The copolymers were prepared by batch or pre-emulsification polymerization.

To illustrate, details of the preparation of Examples 1-5 and 1-6 are provided. The other copolymers of Examples 1-1 to 1-8 were obtained by similar procedures.

Preparation of Examples 1-5 and 1-6

Preparation of Example 1-5

Into a 1-liter reaction vessel were placed the following monomers: butyl acrylate (27.1 g, 0.21 mol), iso-octyl acrylate (14.2 g, 0.08 mol), SPE (16.1 g, 0.06 mol) and 2-(2-ethoxy)ethoxyethyl acrylate (7.25 g, 0.04 mol). Triton X-200 (4.62 g) and deionized water (194 g) were added and the flask was fitted with a mechanical stirrer and purge tubes. The contents were stirred at 55° C. with purging under argon for 45 minutes. Potassium persulfate (0.43 g) was added and the reaction was allowed to proceed for six hours. The resulting emulsion was filtered through cheese cloth.

Preparation of Example 1-6

Into a 1-liter reaction vessel were placed the following monomers: butyl acrylate (60 g, 0.47 mol), 2-hydroxyethyl acrylate (4.8 g, 0.04 mol), and SPE (16.8 g, 0.06 mol). Triton X-200 (5.8 g) and deionized water (163.2 g) were added and the flask was fitted with a mechanical stirrer and purge tubes. The contents were stirred at 55° C. with purging under argon for 45 minutes. Potassium persulfate (0.212 g) was added and the reaction was allowed to proceed for five hours. The resulting emulsion was filtered through cheese cloth.

Table 1 shows the proportions of monomers used in each of the examples in mole % of the total monomer content of the polymerization mixture. The monomers BA and IOA are examples of hydrophobic monomers and EOEOA, HEA and AA are examples of hydrophilic monomers. The proportions used in Examples 1 to 8 produced copolymers having a hydrophobic character.

TABLE 1

Hydrophobic Copolymers

| Example | BA | IOA | EOEOA | HEA | AA | SPE |
| --- | --- | --- | --- | --- | --- | --- |
| 1-1 | 55 | 20 | | 5 | | 20 |
| 1-2 | 52 | 21 | | 16 | | 11 |
| 1-3 | 55 | 20 | | 10 | | 15 |
| 1-4 | 20 | 55 | | 5 | | 20 |
| 1-5 | 55 | 20 | 10 | | | 15 |
| 1-6 | 82 | | | 7.4 | | 10.6 |
| 1-7 | 76.4 | | | | 5.2 | 18.4 |
| 1-8 | 80 | | | | | 20 |

The copolymers of Examples 1-1 to 1-7 were then used as base adhesive copolymers to prepare adhesive formulations 1-1F to 1-7F by adding tackifiers, plasticizers, PVP K-90 and FC-171 (10%) and adjusting the pH with butyldiethanol amine. The composition and final pH of each formulation is shown in Table 1F. In each formulation in Table 1F, "tack 1" was Bu diEtOH, "tack 2" was Tacolyn 98 and "Plast" was N-(2-hydroxy-3-sulphopropyl)-N,N-dimethyl-N-(3-hydroxypropyl)-ammonium betaine. Besides the pH values, the quantities shown in Table 1F are all parts by weight based on one hundred parts by weight of the base adhesive copolymer.

TABLE 1F

Formulations for the Hydrophobic Copolymers 1-1 to 1-7 of Table 1

| Code | Tack 1 | Tack 2 | Plast | PVP | FC-171 | pH |
| --- | --- | --- | --- | --- | --- | --- |
| 1-1F | 10 | 10 | | | 0.05 | 7.35 |
| 1-2F | 40 | 10 | | | 0.05 | 6.78 |
| 1-3F | 40 | 11.5 | | | 0.05 | 6.61 |
| 1-4F | 40 | 10 | | | 0.05 | 7.68 |
| 1-5F | 40 | 10 | | | 0.05 | 7.41 |
| 1-6F | 60 | | 2 | 2 | 0.06 | 4.51 |
| 1-7F | 60 | | 2 | 2 | 0.06 | 7.68 |

The seven formulations, 1-1F to 1-7F, were tested on five types of paper: AKD sized offset; bond (European); bond (Canadian); and rotogravure. The tests were: shear strength; heat resistance; T-peel; and wheel tack (Delrin wheel). The test procedures were those described above. The results for each formulation are shown in tables 1-1F to 1-7F.

TABLE 1-1F (BA/IOA/HEA/SPE, 55/20/5/20)

| Paper | Shear Strength min. | Heat Resistance (150° C. 2 kg) sec. mm | T-Peel N/cm | Wheel Tack mm |
|---|---|---|---|---|
| AKD Sized | 1226+ | 120 + 0.1 | 0.04 | 300 |
| Offset | 10000 | 120 + 0.1 | 0.31 | 247 |
| Bond (Eur) | 1604 | 120 + 0.1 | 0.04 | 300 |
| Bond (Can) | 6629 | 120 + 0.1 | 0.08 | 300 |
| Rotogravure | 10000 | 120 + 0.1 | 0.63 | 42 |

TABLE 1-2F (BA/IOA/HEA/SPE, 52/21/16/11)

| Paper | Shear Strength min. | Heat Resistance (150° C. 2 kg) sec. mm | T-Peel N/cm | Wheel Tack mm |
|---|---|---|---|---|
| AKD Sized | 10000 | 120 + 0.1 | 0.12 | 300 |
| Offset | 10000 | 120 + 0.25 | 1.26 | 300 |
| Bond (Eur) | 10000 | 120 + 0.1 | 0.12 | 300 |
| Bond (Can) | 10000 | 120 + 0.1 | 0.47 | 300 |
| Rotogravure | 10000 | 120 + 0.25 | 0.94 | 104 |

TABLE 1-3F (BA/IOA/HEA/SPE, 55/20/10/15)

| Paper | Shear Strength min. | Heat Resistance (150° C. 2 kg) sec. mm | T-Peel N/cm | Wheel Tack mm |
|---|---|---|---|---|
| AKD Sized | 1662 | 120 + 0.2 | 0.08 | 300 |
| Offset | 10000 | 120 + 0.15 | 0.83 | 92 |
| Bond (Eur) | 1507 | 120 + 0.1 | 0.08 | 300 |
| Bond (Can) | 5522 | 120 + 0.1 | 0.16 | 300 |
| Rotogravure | 10000 | 120 + 0.25 | 0.87 | 182 |

TABLE 1-4F (BA/IOA/HEA/SPE, 20/55/5/20)

| Paper | Shear Strength min. | Heat Resistance (150° C. 2 kg) sec. mm | T-Peel N/cm | Wheel Tack mm |
|---|---|---|---|---|
| AKD Sized | 740 | 120 + 0.2 | 0.08 | 300 |
| Offset | 10000 | 120 + 0.5 | 0.71 | 245 |
| Bond (Eur) | 457 | 120 + 0.4 | 0.08 | 300 |
| Bond (Can) | 299 | 120 + 0.25 | 0.16 | 300 |
| Rotogravure | 10000 | 120 + 0.3 | 0.98 | 103 |

TABLE 1-5F (BA/IOA/EOEOA/SPE, 55/20/10/15)

| Paper | Shear Strength min. | Heat Resistance (150° C. 2 kg) sec. mm | T-Peel N/cm | Wheel Tack mm |
|---|---|---|---|---|
| AKD Sized | 421 | 120 + 0.2 | 0.12 | 300 |
| Offset | 23630 | 120 + 0.5 | 0.91 | 197 |
| Bond (Eur) | 157 | 120 + 0.4 | 0.20 | 300 |
| Bond (Can) | 288 | 120 + 0.25 | 0.43 | 300 |
| Rotogravure | 10000 | 120 + 0.3 | 0.98 | 37 |

TABLE 1-6F (BA/HEA/SPE, 82/7.4/10.6)

| Paper | Shear Strength min. | Heat Resistance (150° C. 2 kg) sec. mm | T-Peel N/cm | Wheel Tack mm |
|---|---|---|---|---|
| AKD Sized | 2988 | 120 + 0.1 | 0.87 | 230 |
| Offset | 10000 | 120 + 0.1 | 1.65 | 75 |
| Bond (Eur) | 1529 | 120 + 0.0 | 0.98 | 114 |
| Bond (Can) | 10000 | 120 + 0.05 | 1.65 | 200 |
| Rotogravure | 10000 | 120 + 0.0 | 0.98 | 30 |

TABLE 1-7F (BA/AA/SPE, 76.4/5.2/18.4)

| Paper | Shear Strength min. | Heat Resistance (150° C. 2 kg) sec. mm | T-Peel N/cm | Wheel Tack mm |
|---|---|---|---|---|
| AKD Sized | 263 | 120 + 0.3 | 0.98 | 300 |
| Offset | 1504 | Failed | 2.17 | 118 |
| Bond (Eur) | 243 | 120 + 0.15 | 1.14 | 300 |
| Bond (Can) | 486 | 120 + 0.3 | 1.73 | 300 |
| Rotogravure | 2550 | 120 + 0.2 | 0.75 | 65 |

Each of the seven formulations, 1-1F to 1-7F, was tested for repulpability using the PTS method as described above. The formulations of Examples 1-2F and 1-7F were found to be repulpable without further modification of the base adhesive copolymers.

EXAMPLES 2-1 to 2-9

Copolymers were prepared using various monomers in combination with the zwitterionic monomer SPE or both SPE and SP-A.

To illustrate, details of the preparation of Examples 2-4, 2-5, 2-6, 2-7 and 2-8 are provided. The other copolymers of Examples 2-1 to 2-9 were obtained by similar procedures.

Preparation of Copolymers of Examples 2-4, 2-5, 2-6. 2-7 and 2-8
Preparation of Example 2-4

Into a 1-liter reaction vessel were placed SPE (4.39 g, 0.016 mol), SP-A (4.17 g, 0.016 mol), AES-21 (1.70 g), Triton X-405 (0.62 g), deionized water (103 g), and sodium carbonate (0.13 g). The contents were stirred at 70° C. and purged for 20 minutes. Potassium persulfate (0.32 g) was dissolved in a minimal amount of water and was added in one portion. 2-Ethoxyethyl acrylate (25.7 g, 0.178 mol) was added dropwise over 12 minutes and the reaction was allowed to proceed for an additional 50 minutes. The resulting emulsion was filtered through the cheese cloth.

Preparation of Example 2-5

Into a 250 mL reaction vessel were placed SPE (3.74 g, 0.013 mol), SP-A (3.55 g, 0.013 mol), 2-hydroxethyl acrylate (2.84 g, 0.02 mol), 2-butoxyethyl acrylate (24.6 g, 0.14 mol), deionized water (105 g), AES-21 (1.77 g), and Triton X-405 (0.2 g). The contents were stirred for seven minutes and sodium carbonate (0.14 g) was added to the reaction. The contents were brought to a temperature of 70° C. After purging for 40 minutes the potassium persulfate (0.35 g) was added. The reaction was allowed to proceed for an additional 1 hour 25 minutes. The resulting emulsion was filtered through cheese cloth.

Preparation of Example 2-6

In a 1-liter reaction vessel were placed the following monomers: 2-butoxyethyl acrylate (18.23 g, 0.11 mol), SPE (2.62 g, 0.009 mol), SP-A (2.49 g, 0.009 mol), Triton X-200 (1.67 g), and deionized water (70 g). The flask was fitted with a mechanical stirrer and purge tubes. The contents were stirred at 65° C. with purging under argon for 1 hour 30 minutes. Potassium persulfate (0.15 g) was added and the reaction was allowed to proceed for eight hours. The resulting emulsion was filtered through cheese cloth.

Preparation of Example 2-7

Into a 500 mL reaction vessel were placed SPE (4.48 g, 0.016 mol), SP-A (4.26 g, 0.016 mol), deionized water (125 g), AES-21 (1.93 g), and Triton X-405 (0.24 g). The contents were stirred for 5 minutes and sodium carbonate (0.16 g) was added. The contents were brought to a temperature of 70° C. After purging for 30 minutes the potassium persulfate (0.42 g) was added. 2-Butoxyethyl acrylate (22.81 g, 0.132 mol) and 2-ethylhexyl acrylate (10.18 g, 0.055 mol) were combined and added dropwise over 25 minutes. The reaction was allowed to proceed for an additional 52 minutes. The resulting emulsion was filtered through cheese cloth.

Preparation of Example 2-8

Into a 250 mL reaction vessel were placed SPE (4.60 g, 0.016 mol), SP-A (4.37 g, 0.016 mol), deionized water (105 g), AES-21 (1.95 g), and Triton X-405 (0.24 g). The contents were stirred for 15 minutes and sodium carbonate (0.17 g) was added to the reaction. The contents were brought to a temperature of 70° C. After purging for 34 minutes the potassium persulfate (0.43 g) was added. 2-Butoxyethyl acrylate (9.46 g, 0.06 mol) and 2-ethylhexyl acrylate (24.3 g, 0.13 mol) were combined and added dropwise over 20 minutes. The reaction was allowed to proceed for an additional one hour. The resulting emulsion was filtered through cheese cloth.

Table 2 shows the proportions of monomers used in each of the examples in mole % of the total monomer content of the polymerization mixture. The monomer EHA is a hydrophobic monomer. Monomers MEA, EOEOA, EOA, BuOEtA and HEA are hydrophilic monomers. The copolymers prepared in these examples had a hydrophilic character.

TABLE 2

Hydrophilic Copolymers

| Example | EHA | MEA | EOEOA | EOA | BuOEtA | HEA | SPE | SP-A |
|---|---|---|---|---|---|---|---|---|
| 2-1 | | 85 | | | | | 15 | |
| 2-2 | | | 90 | | | | 10 | |
| 2-3 | | | 85 | | | | 15 | |
| 2-4 | | | | 85 | | | 7.5 | 7.5 |
| 2-5 | | | | | 71 | 12 | 6.7 | 6.7 |
| 2-6 | | | | | 85 | | 7.5 | 7.5 |
| 2-7 | 25 | | | | 60 | | 7.5 | 7.5 |

TABLE 2-continued

Hydrophilic Copolymers

| Example | EHA | MEA | EOEOA | EOA | BuOEtA | HEA | SPE | SP-A |
|---|---|---|---|---|---|---|---|---|
| 2-8 | 60 | | | | 25 | | 7.5 | 7.5 |
| 2-9 | | 87 | | | | | 13 | |

The copolymers of Examples 2-1 to 2-9 were then used as base adhesive copolymers to prepare adhesive formulations 2-1F to 2-9F by adding tackifiers, plasticizers, PVP K-90 and FC-171 (10%) and adjusting the pH with butyldiethanol amine as was done for Examples 1-1 to 1-7. The base adhesive copolymers used for formulations 2-1AF and 2-3F were prepared by polymerizing the monomer mixture in contact with 0.5 parts by weight, based on 100 parts by weight of the total monomer mixture, of 1-dodecanethiol as a chain transfer agent (CTA). The composition and final pH is shown in Table 2F. In each formulation in Table 2F, "tack 1" was Bu diEtOH, "tack 2" was Tacolyn 98, "tack 3" was a mixture of 87% by weight of Bu diEtOH and 13% by weight of Me diEtOH, and "plast" was N-(2-hydroxy-3-sulphopropyl)-N,N-dimethyl-N-(3-hydroxypropyl)-ammonium betaine. Besides the pH values, the quantities shown in the table are all parts by weight based on one hundred parts by weight of the base adhesive copolymer.

TABLE 2F

Formulations for the Hydrophilic Copolymers 2-1 to 2-9 of Table 2

| Code | Tack 1 | Tack 2 | Tack 3 | Plast | PVP | FC-171 | CTA | pH |
|---|---|---|---|---|---|---|---|---|
| 2-1F | 40 | 10 | | | | 0.05 | | 7.65 |
| 2-1AF | 40 | 10 | | | | 0.05 | 0.5 | 7.95 |
| 2-2F | 40 | 10 | | | | 0.05 | | 6.18 |
| 2-3F | 40 | | | 10 | | 0.05 | 0.5 | 8.53 |
| 2-4F | 40 | | | | | 0.06 | | 5.31 |
| 2-5F | 40 | | | 10 | | 0.06 | | 3.47 |
| 2-6F | 40 | | | | | 0.05 | | 8.52 |
| 2-7F | 40 | | | | | 0.06 | | 4.19 |
| 2-8F | 40 | | | | | 0.06 | | 4.19 |
| 2-9F | | 70 | | | 0.8 | 0.07 | | 8.22 |

Each of the formulations, 2-1F to 2-9F, was tested on five types of paper: AKD sized; offset; bond (European); bond (Canadian); and rotogravure. The tests were: shear strength; heat resistance; T-peel; and wheel tack (Delrin wheel). The test procedures were those described above. The results for each formulation are shown in tables 2-1F to 2-9F.

TABLE 2-1F (MEA/SPE, 85/15)

| Paper | Shear Strength min. | Heat Resistance (150° C. 2 kg) sec. mm | T-Peel N/cm | Wheel Tack mm |
|---|---|---|---|---|
| AKD Sized | 160 | 120 + 0.2 | 0.08 | Not Determined |
| Offset | 10000 | 120 + 0.25 | 1.5 | Not Determined |
| Bond (Eur) | 1382 | 120 + 0.15 | 0.08 | 260 |
| Bond (Can) | 10000 | 120 + 0.25 | 0.35 | Not Determined |
| Rotogravure | 10000 | 120 + 0.1 | 1.14 | 200 |

TABLE 2-1AF (MEA/SPE, 85/15)

| Paper | Shear Strength min. | Heat Resistance (150° C. 2 kg) sec. mm | T-Peel N/cm | Wheel Tack mm |
|---|---|---|---|---|
| AKD Sized | 974 | 120 + 0.5 | 0.71 | 300 |
| Offset | 4032 | 120 + 0.7 | 0.79 | 31 |
| Bond (Eur) | 1557 | 120 + 0.6 | 0.98 | 300 |
| Bond (Can) | 1542 | 120 + 0.5 | 1.34 | 164 |
| Rotogravure | 3904 | 120 + 0.6 | 0.63 | 26 |

TABLE 2-2F (EOEOA/SPE, 90/10)

| Paper | Shear Strength min. | Heat Resistance (150° C. 2 kg) sec. mm | T-Peel N/cm | Wheel Tack mm |
|---|---|---|---|---|
| AKD Sized | 142 | 120 + 0.5 | 0.12 | 300 |
| Offset | 4334 | 120 + 0.15 | 0.94 | 59 |
| Bond (Eur) | 482 | 120 + 0.15 | 0.16 | 300 |
| Bond (Can) | 577 | 120 + 0.1 | 0.63 | 205 |
| Rotogravure | 10000 | 120 + 0.15 | 0.95 | 41 |

TABLE 2-3F (EOEOA/SPE, 85/15)

| Paper | Shear Strength min. | Heat Resistance (150° C. 2 kg) sec. mm | T-Peel N/cm | Wheel Tack mm |
|---|---|---|---|---|
| AKD Sized | 20.7 | Failed | 2.01 | 134 |
| Offset | 30.9 | Failed | 2.40 | 105 |
| Bond (Eur) | 24.1 | Failed | 2.28 | 300 |
| Bond (Can) | 25.8 | Failed | 2.20 | 133 |
| Rotogravure | 39.1 | Failed | 1.97 | 38 |

TABLE 2-4F (EOA/SPE/SP-A, 85/7.5/7.5)

| Paper | Shear Strength min. | Heat Resistance (150° C. 2 kg) sec. mm | T-Peel N/cm | Wheel Tack mm |
|---|---|---|---|---|
| AKD Sized | 74.3 | 120 + 0.8 | 0.1 | 300 |
| Offset | 138 | Failed | 0.51 | 300 |
| Bond (Eur) | 84 | 120 + 0.3 | 0.08 | 300 |
| Bond (Can) | 66 | 120 + 0.4 | 0.16 | Not Determined |
| Rotogravure | 3562 | 120 + 0.0 | 0.79 | Not Determined |

TABLE 2-5F (BuOEtA/HEA/SPE/SP-A, 71/12/6.7/6.7)

| Paper | Shear Strength min. | Heat Resistance (150° C. 2 kg) sec. mm | T-Peel N/cm | Wheel Tack mm |
|---|---|---|---|---|
| AKD Sized | 16 | 120 + 0.0 | 0.06 | 300 |
| Offset | 5604 | 120 + 0.0 | 0.51 | Not Determined |
| Bond (Eur) | 11 | 120 + 0.0 | 0.12 | 300 |
| Bond (Can) | 4328 | 120 + 0.3 | 0.08 | Not Determined |
| Rotogravure | 5603 | 120 + 0.0 | 0.51 | 300 |

TABLE 2-6F (BuOEtA/SPE/SP-A, 85/7.5/7.5)

| Paper | Shear Strength min. | Heat Resistance (150° C. 2 kg) sec. mm | T-Peel N/cm | Wheel Tack mm |
|---|---|---|---|---|
| AKD Sized | 4260 | 120 + 0.6 | 2.63 | 21 |
| Offset | 4260 | Failed | 2.13 | 14 |
| Bond (Eur) | 4260 | 120 + 0.6 | 2.20 | 25 |
| Bond (Can) | 4260 | 120 + 0.8 | 2.36 | 17 |
| Rotogravure | 4260 | 120 + 0.35 | 2.36 | 24 |

TABLE 2-7F (EHA/BuOEtA/SPE/SP-A, 25/60/7.5/7.5)

| Paper | Shear Strength min. | Heat Resistance (150° C. 2 kg) sec. mm | T-Peel N/cm | Wheel Tack mm |
|---|---|---|---|---|
| AKD Sized | 35 | 120 + 0.2 | 0.2 | 42 |
| Offset | 1632 | 120 + 0.15 | 0.63 | 23 |
| Bond (Eur) | 113 | 120 + 0.1 | 0.39 | 55 |
| Bond (Can) | 29 | 120 + 0.1 | 0.43 | 23 |
| Rotogravure | 1632 | 120 + 0.0 | 1.1 | 20 |

TABLE 2-8F (EHA/BuOEtA/SPE/SP-A, 60/25/7.5/7.5)

| Paper | Shear Strength min. | Heat Resistance (150° C. 2 kg) sec. mm | T-Peel N/cm | Wheel Tack mm |
|---|---|---|---|---|
| AKD Sized | 585 | 120 + 0.2 | 0.74 | 70 |
| Offset | 1624 | 120 + 0.4 | 1.46 | 23 |
| Bond (Eur) | 1624 | 120 + 0.35 | 1.02 | 42 |
| Bond (Can) | 1624 | 120 + 0.3 | 1.46 | 21 |
| Rotogravure | 1624 | 120 + 0.4 | 1.46 | 16 |

TABLE 2-9F (MEA/SPE, 87/13)

| Paper | Shear Strength min. | Heat Resistance (150° C. 2 kg) sec. mm | T-Peel N/cm | Wheel Tack mm |
|---|---|---|---|---|
| AKD Sized | 192 | 120 + 0.4 | 0.63 | 96 |
| Offset | 177 | Failed | 1.85 | 25 |
| Bond (Eur) | 86 | 120 + 0.4 | 0.71 | 86 |

TABLE 2-9F-continued (MEA/SPE, 87/13)

| Paper | Shear Strength min. | Heat Resistance (150° C. 2 kg) sec. mm | T-Peel N/cm | Wheel Tack mm |
|---|---|---|---|---|
| Bond (Can) | 111 | 120 + 0.4 | 0.83 | 43 |
| Rotogravure | 346 | 120 + 0.6 | 0.79 | 28 |

Each of the formulations, 2-IF to 2-9F, was also tested for repulpability using the PTS method as described above. The formulations of examples 2-1F, 2-1AF, 2-2F, 2-3F, 2-4F and 2-9F were found to be repulpable without further modification of the base adhesive copolymers.

EXAMPLES 3-1 to 3-4

These examples demonstrate the effectiveness of zwitterionic tackifiers in combination with the zwitterionic copolymers. A tackifier was admixed with a copolymer, as the base adhesive copolymer, obtained by polymerizing SPE and MEA in a mole ratio of 13:87 (SPE:MEA) (see Example 2-9 in Table 2). Four different zwitterionic tackifiers were used, as shown in the first column under the heading "tackifier". These tackifiers were used in varying proportions of 0.5, 0.63 and 0.75 parts per part of base copolymer by weight and on two different types of paper, bond paper and offset paper. Each of these compositions was then subjected to the Delrin wheel test. The base adhesive copolymer alone had a Delrin wheel value of 300mm. The results, in mm travelled by the Delrin wheel, are shown in table 3. As can be seen from the table, addition of the tackifier significantly improved tack.

TABLE 3

Tackifier Evaluation - Wheel Tack

| Paper | Bond | | | Offset | | |
|---|---|---|---|---|---|---|
| Tackifier | 1:0.50 | 1:0.63 | 1:0.75 | 1:0.50 | 1:0.63 | 1:0.75 |
| Bu diEtOH | | 16 | | | 15 | |
| Me diEtOH | 50 | 45 | 34 | 16 | 20 | 16 |
| diMe 1-prOH | 55 | 63 | 54 | 27 | 23 | 33 |
| diEtOH 2-prOH | | 35 | | | 18 | |

EXAMPLES 4-1 and 4-2

Two PSA compositions, a high tack composition and a low tack composition, were formulated. The base copolymer in each case was the copolymer of Example 1-8 of Table 1, a copolymer of BA/SPE having a mole ratio of 80:20. The zwitterionic tackifier A was Me diEtOH and B was Bu diEtOH. The zwitterionic plasticizer A was N-(2-hydroxy-3-sulphopropyl)-N,N-dimethyl-N-(3-hydroxypropyl)-ammonium betaine. PVP K-30 and PVP K-90 were added to improve the strength and toughness of the base copolymer of the formulation. FC-171 (10%) was added to improve wetting of the formulation. The quantities used are shown in table 4 as parts by weight based on 100 parts by weight of the base copolymer.

TABLE 4

| | Formulations | |
|---|---|---|
| Material | Ex 4-1 High Tack (parts by weight) | Ex 4-2 Low Tack (parts by weight) |
| BA/SPE Copolymer | 100 | 100 |
| Zwitterionic Tackifier "A" | 60 | |
| Zwitterionic Tackifier "B" | | 50 |
| Zwitterionic Plasticizer "A" | 10 | |
| PVP K-30 | 3.4 | |
| PVP K-90 | | 3 |
| FC-171 (10%) | 0.067 | 0.092 |

These two formulations 4-1 and 4-2 were then tested on five types of paper: AKD sized; offset; bond (European); bond (Canadian); and rotogravure. Measurements were taken for the following tests: shear strength; heat resistance; T-peel; wheel tack (Delrin wheel); and repulpability (PST test). In the column headed "repulpability" the entry "yes" indicates that the formulation was repulpable according to the PTS test described above. The type of paper used is shown in the left hand column under "paper" in tables 5 and 6. The results of the tests for formulation 4-1 (the high tack formulation) are shown in table 5 and the results of the tests for formulation 4-2 (the low tack formulation) are shown in table 6.

TABLE 5

"High Tack" Results (for formulation of Example 4-1)

| Paper | Shear Strength min. | Heat Resistance (150° C. 2 kg) sec. mm | T-Peel N/cm | Wheel Tack mm | Repulp 10 min. |
|---|---|---|---|---|---|
| AKD Size | 429.3 | 150 | 3.0 | 1.2 | 37 | Yes |
| Offset | 4400 | | | 2.0 | 25 | Yes |
| Bond (Eur.) | 461.7 | 150 | 0.0 | 1.6 | 49 | Yes |
| Bond (Can.) | 253.1 | 150 | 0.0 | 1.5 | 54 | Yes |
| Rotogravure | 4400 | | | | 21 | Yes |

TABLE 6

"Low Tack" Results (for formulation of Example 4-2)

| Paper | Shear Strength min. | Heat Resistance (150° C. 2 kg) sec. mm | T-Peel N/cm | Wheel Tack mm | Repulp 10 min. |
|---|---|---|---|---|---|
| AKD Size | 5600+ | 130+ | 0.1 | 0.59 | | Yes |
| Offset | 6944+ | 130+ | 0.2 | 1.8 | 300+ | Yes |
| Bond (Eur.) | 213.2 | 130+ | 0.2 | 0.19 | 49 | Yes |
| Bond (Can.) | 3042+ | 130+ | 0.1 | 0.35 | 300+ | Yes |
| Rotogravure | 3042+ | 130+ | 0.4 | 1.1 | 241 | Yes |

What is claimed is:

1. An adhesive composition comprising a zwitterionic copolymer and a zwitterionic plasticizer or tackifier, wherein the zwitterionic plasticizer or tackifier comprises 30 to 100 parts by weight of the composition based on 100 parts by weight of the zwitterionic copolymer.

2. An adhesive composition according to claim 1 wherein the zwitterionic copolymer has:

a recurring unit derived from an unsaturated zwitterionic monomer of the formula:

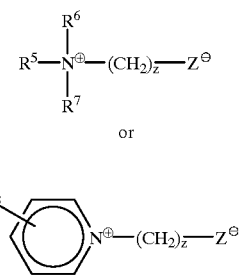

wherein
- $R^5$ is a group containing a carbon-carbon unsaturated bond and being selected from the group consisting of (meth)acryloxy-$(C_{2-4})$alkyl, (meth)acrylamido-$(C_2-C_4)$ alkyl, or $(C_2-C_6)$ alkenyl,
- $R^6$ is $(C_1-C_4)$ alkyl,
- $R^7$ is $(C_1-C_4)$ alkyl or $(C_2-C_6)$ alkenyl,
- $R^8$ is $(C_2-C_6)$ alkenyl,
- z is an integer of 2 to 4, and
- $Z^\ominus$ is $SO_3^\ominus$ or $CO_2^\ominus$, and a recurring unit derived from a monomer copolymerizable with the unsaturated zwitterionic monomer, wherein the monomer is selected from the group consisting of a hydrophobic comonomer and a hydrophilic comonomer other than the unsaturated zwitterionic monomer.

3. An adhesive composition according to claim 1 wherein the zwitterionic copolymer comprises
   (a) N-(3-sulphopropyl)-N-methacryloxy-ethyl-N,N-dimethyl ammonium betaine or N-(3-sulphopropyl)-N-acryloxy-ethyl-N,N-dimethyl ammonium betaine and
   (b) a hydrophobic or hydrophilic comonomer.

4. An adhesive composition according to claim 1 wherein the plasticizer or tackifier is a compound of the formula

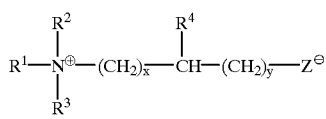

wherein
- $R^1$, $R^2$ and $R^3$ are each alkyl, hydroxyalkyl, aminoalkyl or aryl which may be interrupted in the alkyl chain by one or more oxygen atoms,
- $R^4$ is H or OH,
- $Z^\ominus$ is $CO_2^\ominus$ or $SO_3^\ominus$, and
- x and y are each 0, 1 or 2 provided that the sum of x and y is less than or equal to 4.

5. An adhesive composition according to claim 1 wherein the plasticizer or tackifier is N-(2-hydroxy-3-sulphopropyl)-N,N-dimethyl-N-(3-hydroxypropyl)-ammonium betaine, N-(3-sulphopropyl)-N,N-di(2-hydroxyethyl)-N-butyl-ammonium betaine, N-(3-sulphopropyl)-N,N-di(2-hydroxyethyl)-N-methylammonium betaine, N-(3-sulphopropyl)-N,N-dimethyl-N-(3-hydroxypropyl)-ammonium betaine or N-(3-sulphopropyl)-N,N-di(2-hydroxyethyl)-N-(2-hydroxypropyl)-ammonium betaine.

6. An adhesive composition according to claim 1 wherein the zwitterionic copolymer comprises from 10 to 50 mole % of N-(3-sulphopropyl)-N-methacryloxy-ethyl-N,N-dimethyl ammonium betaine or N-(3-sulphopropyl)-N-acryloxy-ethyl-N,N-dimethyl ammonium betaine.

7. An adhesive composition according to claim 1 wherein the hydrophobic or hydrophilic comonomer is butyl acrylate, iso-octyl acrylate, 2-(2-ethoxy)ethoxy ethyl acrylate, 2-hydroxyethyl acrylate, acrylic acid, 2-ethylhexyl acrylate, 2-methoxyethyl acrylate or 2-butoxyethyl acrylate.

8. An adhesive tape comprising a backing having coated thereon an adhesive composition according to claim 1.

9. A repulpable adhesive tape comprising a repulpable backing having coated thereon an adhesive comprising:
   a repulpable zwitterionic copolymer, and
   a zwitterionic plasticizer or tackifier,
   wherein the zwitterionic plasticizer or tackifier comprises 30 to 100 parts by weight of the composition based on 100 parts by weight of the zwitterionic copolymer.

10. A repulpable tape according to claim 9 wherein the zwitterionic copolymer comprises units derived from a compound of formula II or III,

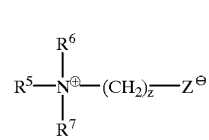

or

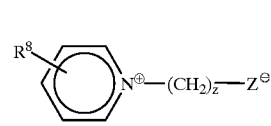

in which $R^5$ is (meth)acryloxy-$(C_2-C_6)$alkenyl, $R^6$ is $C_{1-4}$ alkyl, $R^7$ is $C_{1-4}$ alkyl or $(C_2-C_6)$alkenyl, $R^8$ is $(C_2-C_6)$ alkenyl, z is an integer of 2–4 and $Z^\ominus$ is $SO_3^\ominus$ or $CO_2^\ominus$.

11. A tape according to claim 9 wherein the zwitterionic copolymer comprises N-(3-sulphopropyl)-N-methacryloxy-ethyl-N,N-dimethyl ammonium betaine or N-(3-sulphopropyl)-N-acryloxy-ethyl-N, N-dimethyl ammonium betaine.

12. A tape according to claim 9 wherein the zwitterionic copolymer comprises from 10 to 50 mole % of N-(3-sulphopropyl)-N-methacryloxy-ethyl-N,N-dimethyl ammonium betaine or N-(3-sulphopropyl)-N-acryloxy-ethyl-N,N-dimethyl ammonium betaine.

13. A tape according to claim 9 wherein the zwitterionic copolymer comprises
   (a) N-(3-sulphopropyl)-N-methacryloxy-ethyl-N,N-dimethyl ammonium betaine or N-(3-sulphopropyl)-N-acryloxy-ethyl-N,N-dimethyl ammonium betaine and
   (b) butyl acrylate, iso-octyl acrylate, 2-(2-ethoxy)ethoxy ethyl acrylate, 2-hydroxyethyl acrylate, acrylic acid, 2-ethylhexyl acrylate, 2-methoxyethyl acrylate or 2-butoxyethyl acrylate.

14. A tape according to claim 9 wherein the plasticizer or tackifier is a compound of the general formula

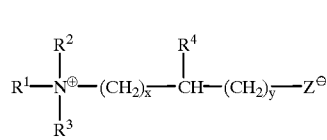

wherein
- $R^1$, $R^2$ and $R^3$ are each alkyl, hydroxyalkyl, aminoalkyl or aryl which may be interrupted in the alkyl chain by one or more oxygen atoms,
- $R^4$ is H or OH,
- $Z^\ominus$ is $CO_2^\ominus$ or $SO_3^\ominus$, and
- x and y are each 0, 1 or 2 provided that the sum of x and y is less than or equal to 4.

15. A tape according to claim 9 wherein the plasticizer or tackifier is N-(2-hydroxy-3-sulphopropyl)-N,N-dimethyl-N-(3-hydroxypropyl)-ammonium betaine, Bu diEtOH, Me diEtOH, diMe 1-prOH or diEtOH 2-prOH.

16. An adhesive composition comprising a zwitterionic copolymer and a zwitterionic plasticizer or tackifier, wherein the plasticizer or tackifier is a compound of the formula

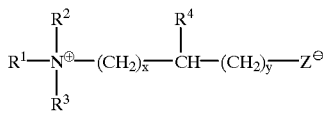

(I)

wherein
- $R^1$, $R^2$ and $R^3$ are selected from alkyl, hydroxyalkyl, aminoalkyl and aryl groups,
- $R^4$ is H or OH,
- $Z^\ominus$ is $CO_2^\ominus$ or $SO_3^\ominus$,
- x and y are selected from 0, 1 or 2, provided that the sum of x and y is less than or equal to 4.

17. A repulpable adhesive tape comprising a repulpable backing having coated thereon an adhesive comprising:
- a repulpable zwitterionic copolymer, and
- a zwitterionic plasticizer or tackifier, wherein the plasticizer or tackifier is a compound of the formula

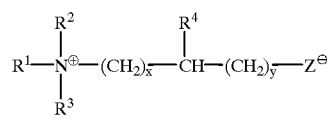

(I)

wherein
- $R^1$, $R^2$ and $R^3$ are selected from alkyl, hydroxyalkyl, aminoalkyl and aryl groups,
- $R^4$ is H or OH,
- $Z^\ominus$ is $CO_2^\ominus$ or $SO_3^\ominus$,
- x and y are selected from 0, 1 or 2, provided that the sum of x and y is less than or equal to 4.

* * * * *

UNITED STATES PATENT AND TRADEMARK OFFICE
CERTIFICATE OF CORRECTION

PATENT NO. : 6,133,391
DATED : October 17, 2000
INVENTOR(S) : Kent E. Nielson, Kai Li, and Terry J. Rayner It is certified that error appears in the above-identified patent and that said Letters Patent is hereby corrected as shown below:

Column 3,
Line 46, "dimethyl 20 ammonium" should read -- dimethyl ammonium --;

Column 19,
Line 67, "coplymer" should read -- copolymer --;

Column 21,
Line 61, "methylammonium" should read -- methyl-ammonium --.

Signed and Sealed this

Thirtieth Day of October, 2001

Attest:

NICHOLAS P. GODICI
Attesting Officer
Acting Director of the United States Patent and Trademark Office